Jan. 28, 1947.    H. J. CRINER    2,414,857
PLURAL ROTARY CUTTER BREAD SLICING MACHINE
Filed Aug. 25, 1944    2 Sheets-Sheet 2
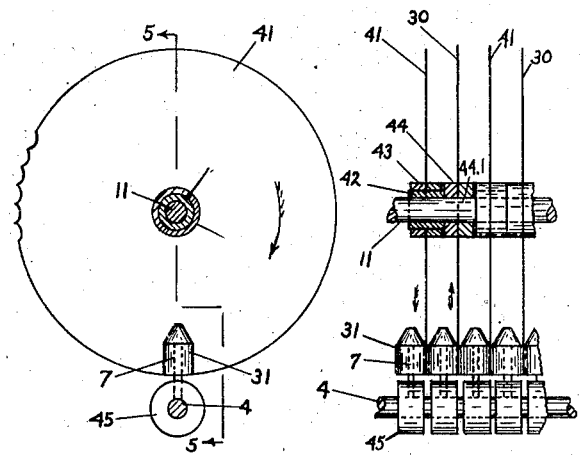
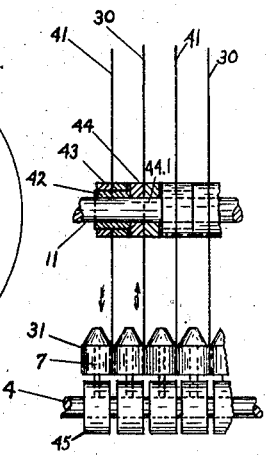
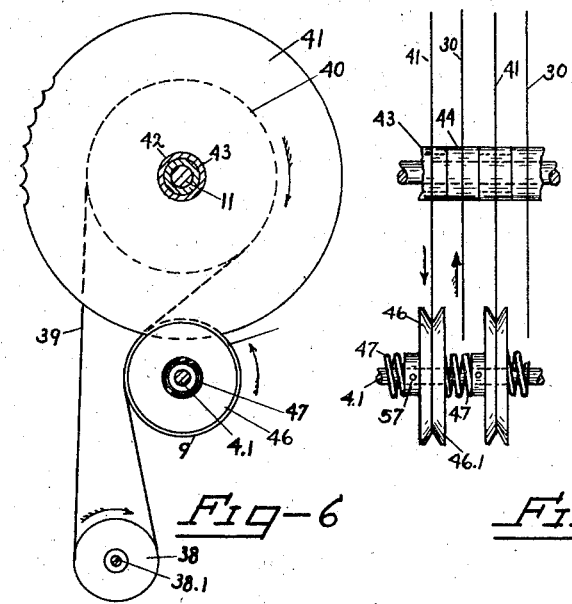
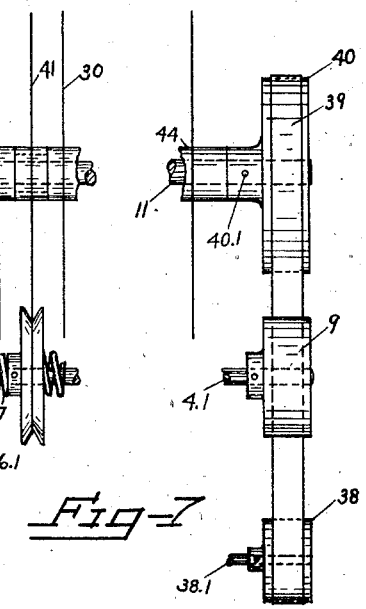
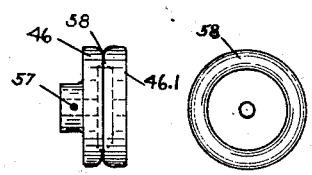
INVENTOR.
Harry J. Criner,
BY Bush & Bush,
His Attorneys.

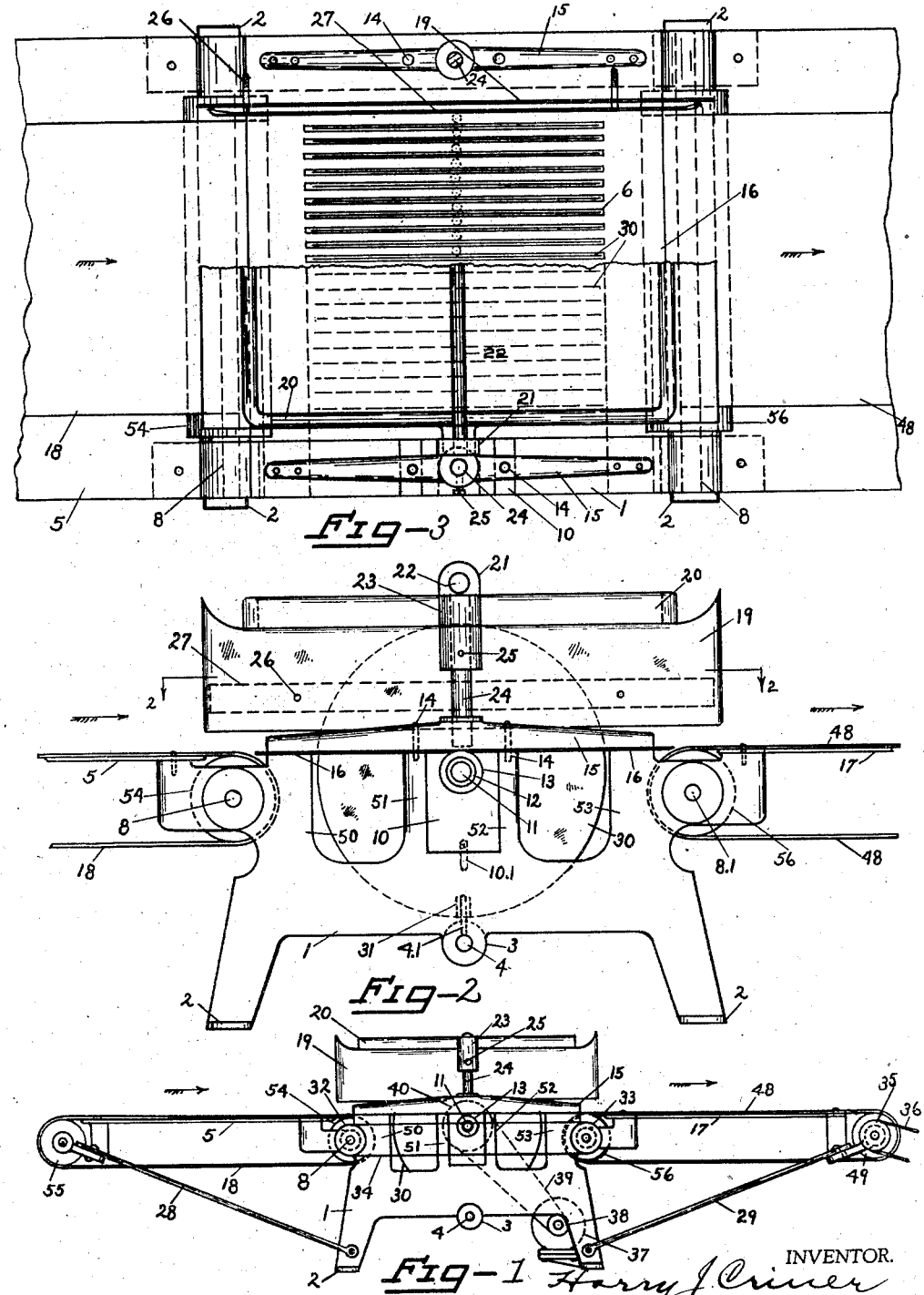

Patented Jan. 28, 1947

2,414,857

UNITED STATES PATENT OFFICE 2,414,857

PLURAL ROTARY CUTTER BREAD SLICING MACHINE

Harry J. Criner, Davenport, Iowa, assignor of one-half to A. G. Bush, Davenport, Iowa Application August 25, 1944, Serial No. 551,158

12 Claims. (Cl. 146—98)

My invention relates to improvements in bread slicing machines of the rotary blade type.

The objects of my invention are to provide an efficient bread slicing machine using a plurality of rotary blades as the slicing elements, with alternate blades running in opposite directions to facilitate the cutting of the bread and to prevent jamming and tearing thereof while passing through the blades; to provide improved means for driving in opposite directions alternate adjacent circular plates or blades in an extended series thereof; to provide means for readily changing a series of rotary blades in a bread slicing machine for the purpose of substituting a differently spaced series of blades. Other objects will appear from the description.

I accomplish these objects by the means illustrated in the accompanying drawings which are illustrative and not drawn strictly to scale.

Figure 1 shows a side elevation of my machine;

Figure 2 shows a side elevation on a larger scale of the middle portion of my machine;

Figure 3 shows a top or plan view of the part shown in Figure 2, with a part of the handle 22 and the cover or hood 19 broken away, showing one of the flanges of the hood 19 and the column 24 in section on the line 2—2 of Figure 2;

Figure 4 is a sectional detail showing blades with my preferred means for driving alternate blades in opposite directions;

Figure 5 is a sectional detail on the line 5—5 of Figure 4;

Figure 6 is a detail of an alternate form of driving mechanism;

Figure 7 is a detail with parts broken away showing a front view of the alternate driving mechanism shown in Figure 6;

Figure 8 is a detail showing a variant form of driving plates.

Similar numerals refer to similar parts throughout the several views.

My machine comprises a rectangular frame 1 with four feet 2 preferably cast integral therewith. The side plates of the frame may be connected by integrally formed crossbars or partitions 50 and 53, extending transversely of the machine. Cast integral with the side plates are vertical posts 51 and 52.

Upon the bars 50 and 53 and posts 51 and 52, supporting bars 15 are mounted at the opposite sides of the frame which may be secured in place upon the frame by dowel pins 14 extending into suitable openings formed in the bars 51 and 52, or other suitable means.

Journal boxes 10 are united to or preferably formed integral with the supporting bars 15 and extend downwardly between the posts 51 and 52 and carry journals 13 and oilless bearings 12 in which are mounted the opposite ends of a transverse blade-shaft 11. United to the bars 15 is a lower guide-plate 16 which rests upon the upper ends of the crossbars 50 and 53 and posts 51 and 52. This guide-plate is slotted to permit the rotary blades 30 and 41 to protrude upwardly therefrom.

The rotary blades 30 are rigidly united to the shaft 11 and may be united by any suitable means, but I prefer to mount them between rings 44 which may be keyed or splined to the shaft by keys 44.1 or other suitable means.

For convenience I refer to the blades 30 as the fixed blades. Between each pair of fixed blades 30 a loose blade 41 is mounted to revolve in the direction opposite to the direction of revolution of the blades 30. The fixed blades are preferably spaced part by spacing rings or oilless bearing collars 42.

Bearing rings 43 are united to the loose blades 41 on each side thereof and may be spot-welded or otherwise suitably secured thereto.

The blade-shaft 11 may be driven by the pulley 40 rigidly united to one end thereof by a pin 40.1 or other suitable means and may be driven by a belt 39 from a drive wheel 36 driven by a drive shaft 38.1 which in turn may be driven by an electric motor 37 or any other suitable prime mover.

In order to drive the loose blades in the opposite direction from the fixed blades, I mount a crossbar 4 in bosses or hubs 3 united to the body of the frame at the opposite sides thereof. On the bar 4 I slidingly mount a series of rings 45 carrying pivot pins 7 upon which may be mounted rolls or needle bearings 31 which are of the right diameter to bear against the fixed blade on one side and the loose blade on the other.

A dowel pin 10.1 may be united to the journal box 10 to project into a suitable opening in the frame 1 to assist in accurately centering the cutting mechanism.

To further assist in properly centering the cutting unit, the upper ends of the rolls 31 should be pointed or the edges of the clutch plates beveled.

In order to provide protection against injury from or to the cutting blades, I mount a safety hood 19 of iron or other suitable material. This hood comprises a slotted top plate with the ends preferably curving upwardly as shown in Figure 2 and with lateral flanges extending downwardly on each side.

To support the hood I mount columns 24 upon the bars 15 at the opposite sides of the machine and slidingly mount upon the columns 24, sleeves 23. In the upper ends 21 of the sleeves 23 I provide bores in which the crossbar 22 is mounted which serves as a handle by which the entire hood can be lifted. The sleeves 23 may be adjustably united to the columns 24 by set screws 25 or other suitable means. By removing the set screws 25 and throwing off the belt 39 from the pulley 40 and then lifting the bar 22, the entire cutting mechanism may be lifted off the machine and another cutting mechanism, assembled in another hood or sub-frame, may be substituted with a different spacing of the blades. The dowel pins 14 and 10.1 form means by which the new cutting mechanism may be accurately located in the frame.

The cutting blades may be formed of any suitable metal or material and are preferably from ten to fifteen one-thousandths of an inch in thickness. They may be formed with serrated edges so as to provide teeth and may be sharpened if desired, although I find that with the thin blades described, sharpening of the teeth is not required. Any desired shape of tooth may be formed upon the edges of the cutters 30 and 41, and if desired, a limited set may be given to the teeth, although this will not ordinarily be necessary.

The slots formed in the guide-plates 16 are preferably two or three one-thousandths of an inch wider than the thickness of the cutting blades so as to allow free revolution of the blades but restrained within the close limits necessary for acceptably slicing bread.

In order to guide the top of the blades I form corresponding slots in the top plate of the hood 19.

To strengthen the hood 19, I cast integral therewith a rib 20 which extends upwardly a short distance from the top of the hood in a rectangle extending entirely around the portion of the hood covering the blades.

As a means for feeding the bread to the machine, I provide a conveyor of canvas or other suitable fabric 18 passing over suitable drums or pulleys 54 and 55 rotatably mounted in extensions of the frame 1. For a discharge conveyor I mount a conveyor 48 upon suitable drums or pulleys 49 and 56. The discharge conveyor 48 may be driven by the wrapping machine belt 36 passing over a pulley 35 mounted upon the same shaft as the drum 49. Brace bars 28 and 29 may be used to help support the feed and discharge conveyors.

The conveyor 48 will drive the shaft of the drum 56. A belt pulley 33 may be mounted upon one end of that shaft and carries a belt 34 which passes around a pulley 32 mounted upon one end of the shaft 8 which carries the drum 54.

If the pulleys are made of the same size, it is obvious that the conveyors 48 and 18 will travel at the same speed.

In order to hold the upper reaches of the conveyor level, I mount a flat plate 5 upon the extension of the frame directly beneath the upper reach of the conveyor 18 and a corresponding plate 17 under the upper reach of the discharge conveyor 48.

As an alternate form of drive for the blades I have shown in Figures 6 and 7 pairs of clutch plates arranged to embrace the outer edges of the loose blades.

These clutch plates may be mounted upon the shaft 4.1 located and supported the same as described for the shaft 4.

Each pair of clutch plates comprises a fixed plate 46 rigidly united to the shaft 4.1 by a pin 57 or other suitable means, and a loose plate 46.1 mounted upon the shaft and spaced from the fixed plate a distance equal to the thickness of a cutting blade. A spring 47 is secured between each pair of clutch plates and acts to exert a limited amount of pressure upon the edge of the blade inserted between the clutch plates.

The shaft 4.1 may be driven by a pulley 9 arranged to engage the drive belt 39 so proportioned relative to the pulley 40 as to give the flange plates and the blades a corresponding peripheral speed so that both the fixed and loose blades will travel at the same speeds.

The adjacent faces of the clutch plates 46 and 46.1 may be flat or they may be formed with a bead 58 to reduce the area of contact between the clutch plates and the blades so as to reduce friction. Likewise, the rolls 31 are arranged on radial lines from the shaft 11 as the center and may be globular instead of cylindrical so as to reduce friction.

In slicing bread, occasionally the end or crust slices will be thinner than the intermediate slices. In order to prevent the end slices from falling out of place, I provide lateral guides in the form of strips of sheet metal extending longitudinally of the hood and adjustably secured to the downwardly extending flanges of the hood and midway of the height of the loaves of bread during the slicing operation. These strips 27 have pins 26 united to them and the pins are slidably mounted in suitable bores formed in the flanges of the hood 19. The pins fit the bores closely enough to remain in any position in which they are placed, but are loose enough to permit manual adjustment inwardly or outwardly as the case may be.

In the operation of my apparatus, the machine is set in motion and the bread placed upon the feed conveyor 18 to travel in the direction shown by the arrows in Figure 1. When it reaches the slotted plate 16, it passes on into contact with the cutting blades in such a way that the cutting blades contact the lower front corner of the loaf first and as alternate blades move in opposite directions, there is sufficient give to the bread to avoid bunching and breaking thereof and the bread passes smoothly through the cutting blades coming out onto the discharge conveyor 48 at the opposite side of the blades, from which it is led to the wrapping machine in the ordinary way.

With my arrangement, when the edges of the blades or teeth get dull, they can readily be sharpened by inserting a suitably shaped whetstone applied to the sides of any given pair of adjacent blades or to a single blade or an entire slicing unit may be removed and replaced by a fresh one having either the same or a different spacing of the blades.

As the blades run in opposite directions, there will be little or no vibration of the machine. In order to change cutting units, the two set screws 25 must be loosened and very little time is required to loosen them and change the cutting units. However, when it is desired to change the spacing of the blades, it is necessary to substitute another crossbar 4 with rollers 31 mounted thereon of the proper thickness to correspond to the spacing of the blades on the substituted set.

In cases where the flange plates 46—46.1 are used to drive the loose blades, a new shaft 41 with the flange plates located thereon to correspond to the spacing of the new set of blades, can be inserted in place of the set removed.

No claim is made for any special form of feed or discharge conveyor or bread wrapping machine, as various forms of all of these are well known and in common use.

It is obvious that various modifications as to size, proportions and arrangement of the parts may be made and various substitutes used for different parts without departing from the spirit of my invention and I do not limit my claims to the precise forms shown in the drawings.

I claim:

1. A bread slicing machine comprising a frame, a transverse shaft supported by the frame carrying a series of fixed circular cutting blades rigidly mounted on the shaft and a series of loose cutting blades having bearings mounted upon the shaft and revolvable independently of the shaft, the fixed and loose blades being arranged in alternation, transverse supporting means supported by the frame, and a series of rolls rotatably mounted upon the transverse supporting means and projecting between the adjacent cutting blades arranged so that each roll will contact a fixed blade on one side and a loose blade on the other side whereby when the shaft and fixed blades are revolved in one direction, the loose blades will be caused to revolve in the opposite direction.

2. A bread slicing machine having a frame and a slicing unit mounted in said frame, a transverse shaft in the slicing unit carrying a series of fixed circular cutting blades rigidly mounted thereon and a series of loose cutting blades mounted upon the shaft on suitable bearings and revolvable independently of the shaft, the fixed and loose blades being arranged in alternation, transverse supporting means supported by the frame, a series of rolls rotatably mounted upon the transverse supporting means and projecting between the adjacent cutting blades near the periphery thereof arranged so that each roll will contact a fixed blade on one side and a loose blade on the other side whereby when the shaft and fixed blades are revolved in one direction, the loose blades will be caused to revolve in the opposite direction.

3. In a bread slicing machine having a frame, a transverse shaft supported by the frame carrying a series of fixed circular cutting blades rigidly mounted thereon and a series of loose cutting blades mounted upon the shaft and revolvable independently of the shaft, the fixed and loose blades being arranged in alternation, transverse supporting means supported by the frame, a series of rolls rotatably mounted upon the transverse supporting means and projecting between the adjacent cutting blades arranged so that each roll will contact a fixed blade on one side and a loose blade on the other side whereby when the shaft and fixed blades are revolved in one direction, the loose blades will be caused to revolve in the opposite direction, and means to drive the transverse shaft.

4. In a bread slicing machine, a frame and a slicing unit removably mounted on said frame, said unit comprising a sub-frame with a transverse shaft carrying a series of fixed circular cutting blades rigidly mounted thereon and a series of loose cutting blades suitably mounted upon the shaft and revolvable independently of the shaft, the fixed and loose blades being arranged in alternation, a transverse bar mounted in the frame parallel to the transverse shaft, a plurality of pivot pins carried by said bar projecting a short distance into the spaces between the blades, rolls mounted on said pivot pins respectively arranged so that each roll will contact a fixed blade on one side and a loose blade on the other side whereby when the shaft and fixed blades are revolved in one direction, the loose blade will be caused to revolve in the opposite direction, and means to drive the blade shaft.

5. In a bread slicing machine, a frame and a slicing unit removably mounted on said frame, said unit comprising a sub-frame with a transverse shaft carrying a series of fixed circular cutting blades rigidly mounted thereon and a series of loose cutting blades suitably mounted upon the shaft and revolvable independently of the shaft, the fixed and loose blades being arranged in alternation, a transverse bar mounted in the frame parallel to the transverse shaft carrying revolvable driving means bearing against and actuated by the fixed blades arranged to bear against the loose blades and drive them in a direction opposite to the direction of revolution of the fixed blades, and means to drive the transverse shaft.

6. In a bread slicing machine, the combination with a main frame, of a slicing unit removably mounted in said frame, a transverse shaft in said unit carrying a series of fixed circular cutting blades rigidly mounted thereon and a series of loose cutting blades suitably mounted upon the shaft and revolvable independently of the shaft, the fixed and loose blades being arranged in alternation, a transverse bar mounted in the main frame parallel to the transverse shaft, a plurality of pivot pins mounted on said bar projecting a short distance into the spaces between the blades, rolls mounted on said pivot pins respectively, arranged so that each roll will contact a fixed blade on one side and a loose blade on the other side whereby when the shaft and fixed blades are revolved in one direction, the loose blade will be caused to revolve in the opposite direction.

7. In a bread slicing machine, the combination with a main frame, of a slicing unit removably mounted in said frame having a transverse shaft carrying a series of fixed circular cutting blades rigidly mounted thereon and a series of loose cutting blades suitably mounted upon the shaft and revolvable independently of the shaft, the fixed and loose blades being arranged in alternation, transvere supporting means supported by the frame, a series of rolls rotatably mounted upon the transverse supporting means between the adjacent cutting blades with their axes lying in a single plane radial to the shaft and so that each roll will contact a fixed blade on one side and a loose blade on the other side whereby, when the shaft and fixed blades are revolved in one direction, the loose blade will be caused to revolve in the opposite direction, and means to revolve the transverse shaft.

8. In a bread slicing machine, a main frame and a slicing unit removably mounted on said frame, said unit comprising a sub-frame with a transverse shaft carrying a series of fixed circular cutting blades rigidly mounted thereon and a series of loose cutting blades revolvable independently of the shaft, the fixed and loose blades being arranged in alternation, a transverse bar mounted in the main frame parallel to the transverse shaft, a plurality of rings mounted upon said bar carrying pivot pins arranged to project a short distance into the spaces between the blades, rolls mounted on said pivot pins respectively arranged so that each roll will contact a fixed blade on one side and a loose blade on the other side whereby when the shaft and fixed blades are revolved in one direction, the loose blade will be caused to revolve in the opposite direction, and a slotted guide plate mounted in the unit above the shaft having close-fitting longitudinal slots through which the blades project upwardly and over which the bread may pass while being sliced.

9. In a bread slicing machine, a frame and a slicing unit removably mounted on said frame, said unit including a transverse shaft carrying a series of fixed circular cutting blades rigidly mounted thereon and a series of loose cutting blades suitably mounted upon the shaft and revolvable independently of the shaft, the fixed and loose blades being arranged in alternation, a transverse shaft or bar mounted in the frame parallel to the transverse shaft, a plurality of collars mounted upon said bar carrying pivot pins projecting a short distance into the spaces between the blades, rolls mounted on said pivot pins respectively arranged so that each roll will contact a fixed blade on one side and a loose blade on the other side whereby when the shaft and fixed blades are revolved in one direction, the loose blade will be caused to revolve in the opposite direction, and a slotted guide plate mounted in the unit above the shaft having close-fitting longitudinal slots through which the blades project upwardly and over which the bread may pass while being sliced, said main frame including a pair of posts united thereto and extending upwardly on opposite sides thereof and said sub-frame including a pair of sleeves mounted on said posts.

10. In a bread slicing machine, a main frame and a slicing unit removably mounted on said frame, said unit comprising a sub-frame with a transverse shaft carrying a series of fixed circular cutting blades rigidly mounted thereon and a series of loose cutting blades revolvable independently of the shaft, the fixed and loose blades being arranged in alternation, a transverse bar mounted in the frame parallel to the transverse shaft, a plurality of pivot pins carried by said bar projecting a short distance into the spaces between the blades, rolls mounted on said pivot pins respectively arranged so that each roll will contact a fixed blade on one side and a loose blade on the other side whereby when the shaft and fixed blades are revolved in one direction, the loose blade will be caused to revolve in the opposite direction, and a slotted guide plate mounted in the unit above the shaft having close-fitting longitudinal slots through which the blades project upwardly and over which the bread may pass while being sliced, said main frame including means extending upwardly on opposite sides thereof to support the sub-frame, and said sub-frame including means to coact therewith to maintain the sub-frame in fixed, adjusted position, and a cover or hood having side plates and a slotted top plate carried by said unit, the slots in the top plate being parallel to and extending in the same planes as the slots in the lower guide plate, whereby said upper slots may receive and guide the uppermost portions of the blades.

11. A mechanical movement comprising a frame, a transverse shaft revolvably mounted thereon carrying a series of spaced fixed circular blades rigidly recured thereto and a series of loose blades revolvable independently of the shaft, the fixed and loose blades being arranged in alternation on the shaft, transverse supporting means supported by the frame, a series of rolls pivotally mounted upon the transverse supporting means between the adjacent blades arranged so that each roll will contact a fixed blade on one side and a loose blade on the other side whereby when the shaft and fixed blades are revolved in one direction, the loose blades will be caused to revolve in the opposite direction.

12. In a bread slicing machine, a main frame and a slicing unit removably mounted on said frame, including a transverse blade-shaft carrying a series of fixed circular cutting blades rigidly mounted thereon and a series of loose cutting blades revolvable independently of the shaft, the fixed and loose blades being arranged in alternation, revolvable driving means bearing against and actuated by the fixed blades arranged to bear against and drive the loose blades in a direction opposite to the direction of revolution of the fixed blades, and means to drive the transverse shaft.

HARRY J. CRINER.